United States Patent
Rovetto et al.

(10) Patent No.: US 12,448,642 B2
(45) Date of Patent: Oct. 21, 2025

(54) BIOLOGICAL INDICATOR FOR DETERMINING THE EFFICACY OF AN OXIDATIVE STERILIZATION PROCESS AND METHODS OF USE

(71) Applicant: TERRAGENE LLC, Spring, TX (US)

(72) Inventors: Adrián Jesús Rovetto, Alvear (AR); Esteban Lombardía, Alvear (AR); Pablo Ravasi, Alvear (AR); Carlos Ernesto Rodriguez, Alvear (AR)

(73) Assignee: TERRAGENE LLC, Spring, TX (US)

( * ) Notice: Subject to any disclaimer, the term of this patent is extended or adjusted under 35 U.S.C. 154(b) by 54 days.

(21) Appl. No.: 17/367,224

(22) Filed: Jul. 2, 2021

(65) Prior Publication Data

US 2023/0002802 A1   Jan. 5, 2023

(51) Int. Cl.
    *C12Q 1/22*      (2006.01)
    *G01N 21/64*     (2006.01)

(52) U.S. Cl.
    CPC ........... *C12Q 1/22* (2013.01); *G01N 21/6486* (2013.01)

(58) Field of Classification Search
    CPC .................................................... C12Q 1/22
    See application file for complete search history.

(56) References Cited

U.S. PATENT DOCUMENTS

| | | | |
|---|---|---|---|
| 9,717,812 | B2 | 8/2017 | Chandrapati |
| 10,047,334 | B2 | 8/2018 | Chandrapati |
| 2014/0370535 | A1 | 12/2014 | Chandrapati |
| 2015/0159192 | A1 | 6/2015 | Foltz |
| 2017/0283847 | A1 | 10/2017 | O'Keefe |
| 2017/0292143 | A1 | 10/2017 | Cote |
| 2020/0123492 | A1* | 4/2020 | Lombardia ............ C12M 23/54 |

FOREIGN PATENT DOCUMENTS

| | | |
|---|---|---|
| CA | 2667698 C | 3/2017 |
| EP | 2456882 B1 | 10/2017 |
| JP | 2014060947 A | 4/2014 |
| WO | WO2017185738 A1 | 11/2017 |
| WO | WO-2018071732 A1 * | 4/2018 |

OTHER PUBLICATIONS

Dias, F. N., Ishii, M., Nogaroto, S. L., Piccini, B., & Penna, T. C. (2009). Sterilization of medical devices by ethylene oxide, determination of the dissipation of residues, and use of Green Fluorescent Protein as an indicator of process control. Journal of Biomedical Materials Research Part B: Appli (Year: 2009).*

* cited by examiner

*Primary Examiner* — Robert J Yamasaki
*Assistant Examiner* — Trevor Kane
(74) *Attorney, Agent, or Firm* — MUNCY, GEISSLER, OLDS & LOWE, P.C.

(57) ABSTRACT

A biological indicator for determining the efficacy of an oxidative sterilization process, and its methods of use. The biological indicator comprises a set of microbial spores, at least one fluorescent sensor protein, and a culture medium, the fluorescent sensor protein being capable of yielding an optically detectable signal when the fluorescent sensor protein is not in a denatured state due to the oxidative sterilization process, and a different optically detectable signal when the fluorescent sensor protein is in a denatured state after the oxidative sterilization process.

19 Claims, 3 Drawing Sheets

BIOLOGICAL INDICATOR FOR DETERMINING THE EFFICACY OF AN OXIDATIVE STERILIZATION PROCESS AND METHODS OF USE

FIELD OF THE INVENTION

The present invention refers to biological indicators suitable for determining the outcome of an oxidative sterilization process, such as a sterilization process employing hydrogen peroxide.

BACKGROUND OF THE INVENTION

Sterilization processes are aimed at providing surfaces or objects (e.g. laboratory or medical devices, instruments or utensils) that are free of viable forms of life. Such processes are used extensively in contexts like the healthcare industry or a wide range of scientific research activities.

A central aspect of such processes is the ability to determine whether the sterilization process was successful, in order to ensure the required conditions of use of the sterilized material and/or surface. To this end, several methods are employed with varying degrees of quality.

Biological indicators known in the art generally involve subjecting a known amount of microbial spores, such as bacterial spores, to a sterilization process along with the target material and/or surface. Immediately after the process is complete, tests are carried out in order to probe the presence of remaining living and/or viable microorganisms. If these tests yield negative results, then it may be determined that the sterilization was effective.

More specific biological indicators include probing the occurrence of certain biochemical reactions that are known to indicate the presence of viable forms of life. Such biochemical reactions relate to enzymatic and/or catalytic activity commonly found in microbial life or color change in a dye.

Patent application US 2015/0159192 A1 discloses a method of determining the success of a sterilization process comprising the use of an isolated enzyme or the microorganism to which such enzyme is endogenous or expressed by genetic engineering. Indicator enzymes according to this disclosure are enzymes found commonly in spore forming microorganisms such as beta-D-glucosidase. After the indicator has been exposed to a sterilization process, an enzymatic activity test is carried out in order to assess the effectiveness of the sterilization.

Other biological indicators are based on the use of genetically engineered microorganisms capable of expressing specific reporter genes.

Patent application WO 2018/071732 A1 discloses a biological indicator making use of genetically engineered microorganisms capable of expressing reporter genes that are suitable to be screened for fluorescence (e.g. reporter genes suitable for expression of fluorescent proteins). After the indicator has been subjected to the sterilization process, it is screened for optically detectable signals, thus evidencing the presence or absence of viable microorganisms.

Similarly, patent application WO 2017/185738 A1 discloses a biological indicator based on the use of spores from genetically engineered microorganisms expressing specific fluorescent reporter genes. After the sterilization process, the indicator is screened for optically detectable signals, in order to assess the presence of viable microorganisms.

Other biological indicators known in the prior art comprise providing a genetically engineered microorganism suitable for expression of specific enzymes, in order to screen enzymatic activity of said specific enzyme after sterilization.

Patent application US 2017/0292143 A1 discloses genetically engineered microorganisms suitable for expression of a specific enzyme (e.g. β-lactamase) which is able to hydrolyze a fluorogenic compound designed to emit fluorescence by hydrolysis. The optically detectable fluorescent signal therefore indicates the presence of viable microorganisms.

Other biological indicators employ the screening of surrogate proteins selected from proteins critical for the growth of infectious agents, and pathogenic or immunogenic proteins.

Patent application US 2017/0283847 A1 discloses a biological indicator based on the screening for a defined surrogate protein after a sterilization process. The disclosed method requires procedures such as Western Blot analysis in order to assess the presence of the target protein.

Other biological indicators of similar characteristics also employ genetically modified microorganisms or mutant and/or labeled proteins and/or enzymes in order to enable an effective screening after sterilization, such as disclosed by CA 2667698 C, U.S. Pat. No. 9,717,812 B2, EP 2456882 B1, U.S. Pat. No. 10,047,334 B2, US 20140370535 A1 and JP 2014-060947 A.

The biological indicators of the prior art generally rely on complex, costly and significantly time-consuming procedures for both production and use, affecting the overall costs of the biological indicator per se and of sterilization processes in general. Biological indicators based on such procedures demand considerable incubation and/or readout time, which also represents a significant expense in time and resources. Biological indicators that rely solely on screening enzymatic activity are limited by the generally low stability of the employed enzyme. Inherent characteristics of enzymes, like their structure and catalytic activity, have a negative effect on the overall stability of the indicator and the effectiveness of the system. Moreover, longer periods of time are needed in order to screen enzymatic activity.

Therefore, the need remains for a biological indicator that is both reliable and cost-effective, capable of reducing incubation and/or readout times, and without involving costly procedures and/or requirements.

Additionally, it is desirable that the indicator does not require development stages comprising Western Blot analysis, protein array analysis, magnetic separation analysis, mass spectrometry analysis, peptide analysis, chromatography analysis, nor gas chromatography analysis, which require specialized equipment and are considerably time-consuming.

On the other hand, the fact that the biological indicator does not depend on enzymatic reactions to indirectly determine the outcome of a sterilization process provides more reliable results. Enzymatic reactions are complex physical and chemical phenomena that require a wide range of favorable conditions in order to take place. For example, and as is known to a person skilled in the art, enzymatic activity depends greatly on the structure and nature of an enzyme active site. Even a small variation in any of the characteristics of such active sites, or in the environmental conditions around the enzyme, may have significant consequences in the enzyme ability to properly carry out the reaction. The chances of such variations entail serious potential flaws for a biological indicator reliant on enzymatic reactions, as these might incorrectly indicate the success of a sterilization.

BRIEF DESCRIPTION OF THE INVENTION

The present invention relies only on the results of two simple and straightforward tests, namely a fluorescence intensity test and a colorimetric test, rendering the overall process significantly more time- and cost-effective in relation to the prior art.

In a first aspect, the present invention relates to a self-contained biological indicator for determining the efficacy of an oxidative sterilization process, employing both an immediate fluorescence signal detection and a colorimetric test after a certain incubation time.

It is therefore an object of the present application a device for determining the efficacy of an oxidative sterilization process comprising a flexible container, comprising:
 a) a set of microbial spores,
 b) at least one fluorescent sensor protein,
 c) a culture medium, and
 d) a pH indicator or colorimetric component for extended readout confirmation.

The at least one fluorescent sensor protein is capable of yielding an optically detectable signal, i.e., a fluorescence signal, when the at least one sensor protein is not in a denatured state due to the oxidative sterilization process and is further capable of yielding a different optically detectable signal, i.e., a different fluorescence signal, such as a signal with different intensity, depending on the tridimensional structure of the at least one fluorescent sensor protein and the polarity of the environment, when the at least one fluorescent sensor protein is in a denatured state after the oxidative sterilization process. Advantageously, this difference is independent of a catalytic activity of the at least one fluorescent sensor protein and the culture medium being brought into contact with the set of microbial spores.

The culture medium is capable of inducing growth of any viable microbial life present after the oxidative sterilization process, and comprises the colorimetric component being capable of undergoing an optically detectable color change in the presence of microbial growth.

In embodiments of the invention, the oxidative sterilization process is a process employing an oxidizing agent selected from ozone, oxygen, hydrogen peroxide and sulfuric acid. Preferably, the oxidative sterilization process is a hydrogen peroxide sterilization process.

In an embodiment of the invention, the set of microbial spores in a) are bacterial spores.

In a preferred embodiment of the invention the set of microbial spores in a) are bacterial spores selected from the group comprising *B. atrophaeus, B. subtilis, G. stearothermophilus,* and *B. pumilus*.

In a preferred embodiment of the present invention, the microbial spores are embedded in a carrier.

In another preferred embodiment of the present invention, the fluorescent sensor protein is also embedded in the carrier.

In another embodiment of the invention, the fluorescent sensor protein is selected from the group comprising green fluorescent proteins (Green Fluorescent Protein wild type GFPwt, Enhanced Green Fluorescent Protein EGFP, Super Folder Green Fluorescent Protein SFGFP, Emerald, *Aequorea Victoria* jellyfish Green Fluorescent Protein avGFP, T-Saphire), blue fluorescent proteins (Sirius, Azurite, Enhanced Blue Fluorescent Protein EBFP, Enhanced Blue Fluorescent Protein 2 EBFP2, mKalama1, Enhanced Tagged Green Fluorescent Protein TagGFP), cyan fluorescent proteins (Enhanced Cyan Fluorescent Protein ECFP, Cerulean, CyPet, mTurquoise2, Super Cyan Fluorescent Protein SCFP), yellow fluorescent proteins (Yellow Fluorescent Protein YFP, Citrine, Venus, YPet, Super Yellow Fluorescent Protein SYFP, Topaz, mAmetrina), red fluorescent proteins (tdTomato, mPlum, DsRed, mCherry, mStrawberry, mRaspberry, mRuby) and orange fluorescent proteins (mOrange, monomeric Kusabira Orange mKO and mOrange2).

In addition, chimeric proteins of these fluorescent proteins, as well as chimeric proteins comprising a fluorescent protein fused to a non-fluorescent protein such as fibrin, elastin, casein, collagen, actin, keratin, albumin and enzymes like lysozyme, amylase, lipase, pepsin, glucosidase, phosphatase, galactosidase, chymotrypsin and lipase may also be used, but only due to their structural features, not in relation to their catalytic activity.

In a preferred embodiment of the present invention, the culture medium is contained in a breakable ampoule.

In another embodiment of the invention, the culture medium components comprise bacteriological peptone, yeast extract and L-valine.

In a preferred embodiment of the present invention, the culture medium comprises a colorimetric component.

In an embodiment of the present invention, the colorimetric component of the culture medium is selected from a group comprising bromocresol purple, bromocresol green, phenol red, thymol blue, bromophenol blue, bromothymol blue, 6-chloro-3-indoxyl-alpha-D-glucopyranoside, 5-bromo-4-chloro-3-indolyl α-D-glucopyranoside, 6-chloro-3-indoxyl-beta-D-galactopyranoside, 5-bromo-4-chloro-3-indolyl β-D-galactopyranoside, 5-bromo-4-chloro-3-indoxyl phosphate.

In a yet more preferred embodiment of the present invention, the fluorescent sensor protein and the microbial spores are mixed together as a formulation in the carrier.

In a preferred embodiment of the present invention, the breakable ampoule is made of a material with low thermal expansion coefficient, preferably borosilicate glass.

In a second aspect of the invention, another object is a method of use of the previously described biological indicator of the invention, said method of use generally comprising:
 a) placing the biological indicator along with a target material to be sterilized within a sterilizer,
 b) carrying out an oxidative sterilization process,
 c) placing the biological indicator in an incubator,
 d) screening the biological indicator for immediate detectable changes in fluorescence intensity, while incubating the biological indicator in the incubator,
 e) determining the efficacy of the oxidative sterilization process based on the screening carried out during step d),
 f) extending the incubation of the biological indicator obtained in step d)
 g) screening the incubated biological indicators obtained in step e) for an optically detectable color change, and
 h) determining the efficacy of the oxidative sterilization process, according to optically detectable changes obtained in step g).

In an embodiment of the method of the present the invention, in steps a) and b) the biological indicator is placed inside the sterilizer and alongside the target material.

In a preferred embodiment of the method of the present invention, the incubator is selected from a Terragene Incubator Reader BIONOVA® (IC10/20FR or IC10/20FRLCD) or a MiniBio incubator.

In another embodiment of the method of the present invention, in step c) the previously prepared available incubator is set at a temperature in the range of 55-65° C., preferably 58-62° C., yet more preferably 60° C.

In an embodiment of the method of the present invention, in step c) the ampoule is crushed immediately before the biological indicator is placed within the incubator.

In an embodiment of the method of the present invention, during step d) the biological indicator is screened for changes in fluorescence intensity, immediately after sterilization and while starting incubation.

In an embodiment of the method of the present invention, during step g) the efficacy of the oxidative sterilization process is determined according to the results obtained from both steps d) and g). A positive result in any one of steps d) or f) indicates an incomplete or failed sterilization process.

DETAILED DESCRIPTION OF THE INVENTION

The biological indicator provided by the invention is a self-contained device, which means that the set of microbial spores, the one or more fluorescent sensor proteins and the culture medium are contained within a single flexible container, which helps avoiding possible contaminations due to manipulation. The culture medium is nonetheless separated from the set of microbial spores, within a breakable ampoule contained in the flexible container, due to the need to bring these two elements into contact only after the sterilization process is complete.

Figure 3:
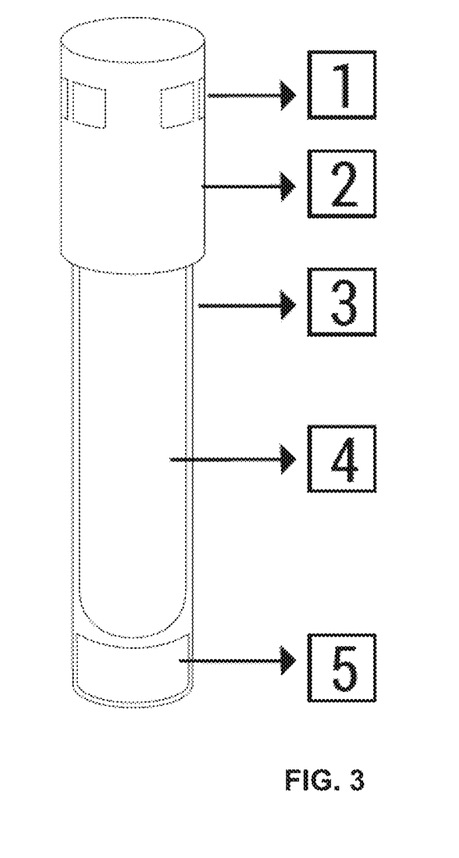
FIG. 3 shows a schematic side view of the biological indicator of the invention.

In an embodiment of the invention, the biological indicator comprises a flexible container as schematized in FIG. 3, comprising a cap 2 for sealing the flexible container, cap orifices 1, a container tube 3, an ampoule 4 containing culture medium and a carrier 5 containing the microbial spores.

In certain embodiments, the flexible container is a transparent polypropylene tube.

In another embodiment, the flexible container comprises a movable cap that may be pushed down in order to seal the container.

In other embodiments, the microbial spores are embedded in a carrier contained within the flexible container.

In certain embodiments, the microbial spores are embedded in a carrier made of a porous material, such as polypropylene fibers material, high-density polyethylene fibers, or in the polypropylene container itself.

In a preferred embodiment, the high-density polyethylene fibers carrier is a sheet of paper with a grammage of 55 to 80 g/m².

In an embodiment of the present invention, the ampoules are made of a fragile material with low thermal expansion coefficient, such as borosilicate glass, preferably glass, and contain 0.5 to 0.9 mL of culture medium.

In a preferred embodiment, the culture medium comprises 0.8 to 1.2 g/L of bacteriological peptone; 0.8 to 1.2 g/L of yeast extract and 0.4 to 0.6 g/L of L-valine.

In a preferred embodiment, the culture medium comprises 0.03 g/L of bromocresol purple indicator as a colorimetric component. Said culture medium has an adjusted pH between 7 and 9 preferably around 8.5. In a particular preferred embodiment, the pH is adjusted with sodium hydroxide.

In some embodiments, detection of a change in fluorescence intensity as a result of the denaturation of the at least one fluorescent sensor protein may be achieved by means of a device for detecting fluorescence intensity or fluorimeter.

In a preferred embodiment of the invention, the fluorimeter is integrated to the incubator, in order to minimize handling and movement of the biological indicator. This way, the detection of a change in fluorescence intensity can be made directly in the same incubator, without requiring further steps to obtain a fluorescence readout.

In some embodiments, detection of a change in color as a result of a colorimetric test may be achieved by means of direct visual observation or by means of a camera with subsequent image analysis.

The at least one fluorescent sensor protein is also contained in the carrier.

While contained in the carrier with the spores, the at least one fluorescent sensor protein and the spores are subjected to the same conditions (oxidizing agent concentration, time and temperature) as the target material to be sterilized.

The amount of fluorescent sensor protein present in the carrier is in the range of 5-100 µg, preferably 25 µg.

Said at least one fluorescent sensor protein is selected from the group comprising green fluorescent proteins (GFPwt, EGFP, SFGFP, Emerald, avGFP, T-Saphire), blue fluorescent proteins (Sirius, Azurite, EBFP, EBFP2, mKalama1, TagGFP), cyan fluorescent proteins (ECFP, Cerulean, CyPet, mTurquoise2, SCFP), yellow fluorescent proteins (YFP, Citrine, Venus, YPet, SYFP, Topaz, mAmetrina), red fluorescent proteins (tdTomato, mPlum, DsRed, mCherry, mStrawberry, mRaspberry, mRuby) and orange fluorescent proteins (mOrange, mKO and mOrange2).

Chimeric proteins, i.e., fusion proteins, comprising any number of these fluorescent proteins or chimeric proteins comprising a fluorescent protein fused to a non-fluorescent protein such as fibrin, elastin, casein, collagen, actin, keratin, albumin and enzymes like lysozyme, amylase, lipase, pepsin, glucosidase, phosphatase, galactosidase, chymotrypsin and lipase can also be used. These non-fluorescent proteins are to be selected in accordance with their structural features, not in relation to their catalytic activity.

Fluorescence in fluorescent proteins, such as GFP, is directly linked to a "properly folded" protein structure. In the case of GFP, in its native, i.e., non-denatured, structure, the fluorescent tripeptide formed by serine 65, tyrosine 66 and glycine 67 has limited movement and is excluded from the bulk of water. Only when these fluorescent GFP proteins are denatured does the chromophore increase its rotational freedom and is further attacked by water molecules, leading to a quenching of the fluorescence phenomenon.

Oxidizing agents such as ozone, oxygen, hydrogen peroxide and sulfuric acid are highly reactive and predominantly target the cysteine residues of proteins. When any of these oxidizing agents is present in sufficiently high concentrations, the oxidative stress to which exposed macromolecules are subjected causes an irreversible damage, resulting in denaturation to their tridimensional structure.

The at least one fluorescent sensor protein to be used in the present invention is sensitive to oxidizing agents in general and hydrogen peroxide in particular. Its tridimensional structure is closely related to conditions of the hydrogen peroxide sterilization process, such as exposition and concentration. Time of exposure to said conditions is also an important factor influencing the tridimensional structure.

In particular embodiments, the fluorescent sensor protein may be synthesized by microorganisms, such as genetically engineered microorganisms that express specific fluorescent macromolecules.

Non-limiting examples of genetically engineered microorganisms that synthetize these fluorescent sensor proteins include B. atrophaeus, B. subtilis, G. stearothermophilus, and B. pumilus. These microorganisms are generally modified with a replicative plasmid capable of expressing the fluorescent sensor protein during the spore formation process. In this way, the fluorescent sensor protein will be a part of the spore proteins and will be in contact with the oxidizing agent during the sterilization process. Said at least one fluorescent sensor protein is selected from the group comprising green fluorescent proteins (GFPwt, EGFP, SFGFP, Emerald, avGFP, T-Saphire), blue fluorescent proteins (Sirius, Azurite, EBFP, EBFP2, mKalama1, TagGFP), cyan fluorescent proteins (ECFP, Cerulean, CyPet, mTurquoise2, SCFP), yellow fluorescent proteins (YFP, Citrine, Venus, YPet, SYFP, Topaz, mAmetrina), red fluorescent proteins (tdTomato, mPlum, DsRed, mCherry, mStrawberry, mRaspberry, mRuby) and orange fluorescent proteins (mOrange, mKO and mOrange2).

Figure 1:
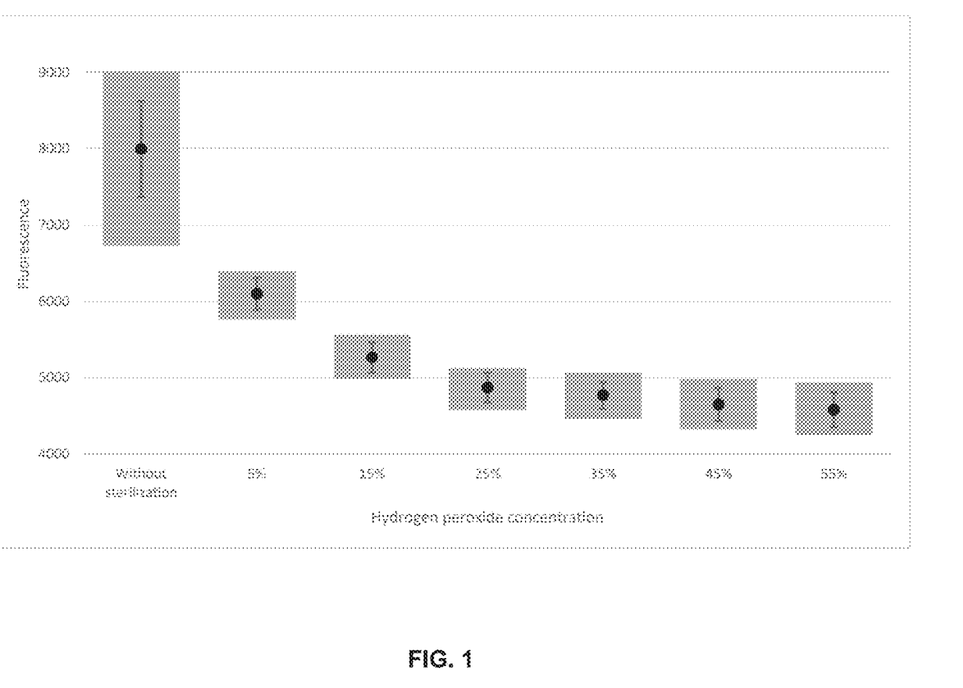
FIG. 1 shows the fluorescence intensity of a fluorescent protein at different oxidizing agent concentrations.

FIG. 1 shows the fluorescence intensity of 25 µg of lyophilized ECFP after 200 seconds of exposure time at different hydrogen peroxide concentrations in a CASP 50 flash device. The detailed hydrogen peroxide concentration corresponds to the equipment loading solution. Immediately after the exposure, the lyophilized protein was re-suspended in 1 mL of buffer tris base 0.015% at pH 8.5. Fluorescence was measured during 7 seconds of incubation with a fluorimeter set up to wavelengths between 420-450 nm for excitation and 470-490 nm for emission. 10 tubes per hydrogen peroxide concentration were evaluated. Black dots represent mean values. Boxes contain the maximum and minimum registered values. Inner bars represent the standard deviation. The non-sterilized condition is also shown. As the hydrogen peroxide concentration increases, the measured fluorescence is lower. Specifically, a higher concentration, close to the 55% used in commercial sterilizers, results in a more drastic fluorescence intensity decrease.

Figure 2:
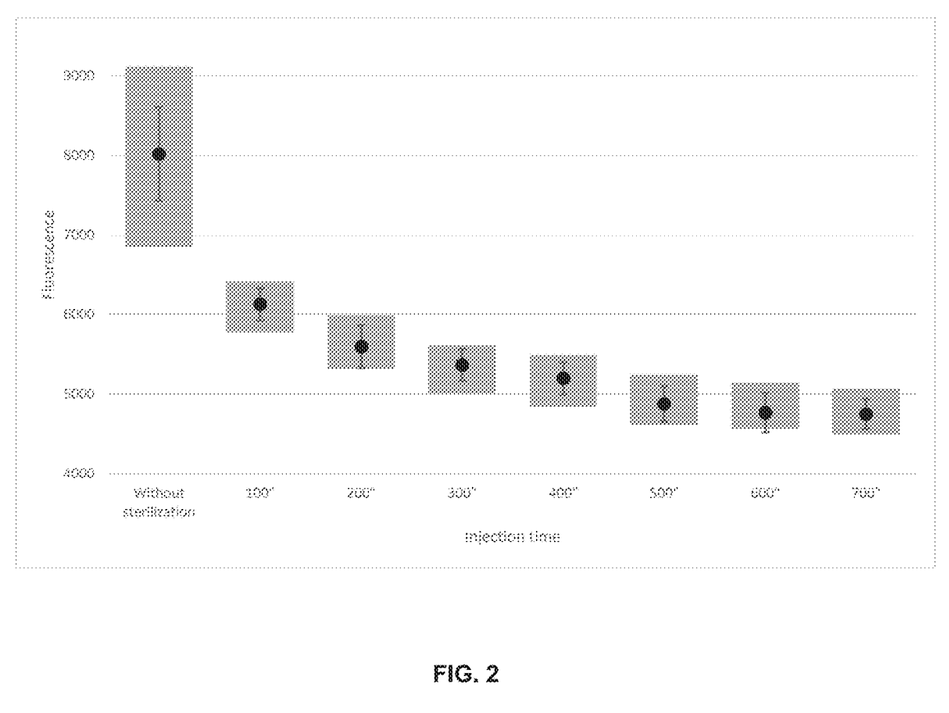
FIG. 2 shows the fluorescence intensity of a fluorescent protein at different injection times.

FIG. 2 shows the fluorescence intensity of 25 µg of lyophilized ECFP after different injection times using a 5% v/v concentration of hydrogen peroxide in a CASP 50 flash device. Immediately after the exposure the lyophilized protein was re-suspended in 1 mL of buffer tris base 0.015% at pH 8.5. Fluorescence was measured during 7 seconds of incubation with a fluorimeter setting up wavelengths between 420-450 nm for excitation and 470-490 nm for emission. 10 tubes per hydrogen peroxide concentration were evaluated. Black dots represent mean values. Boxes contain the maximum and minimum registered values. Inner bars represent the standard deviation. The non-sterilized condition is also shown. With the increase of time, the measured fluorescence is lower.

As seen in FIG. 1, at the concentration at which the hydrogen peroxide sterilization processes are usually carried out, i.e. 55%, a change in fluorescence is observed due to changes in the protein tridimensional structure. Higher concentrations cause a more thorough and widespread denaturation of the sensor proteins. This interaction yields a substantially lower fluorescent signal that its previous interaction with the structurally intact proteins.

A person skilled in the art will recognize that changes in the tridimensional structure of proteins exposed to high oxidizing agent concentrations are necessarily linked to the death of microorganisms that undergo the same exposure (since life is unsustainable for a microorganism when all or a significant majority of its constituent proteins are denatured). As such, a change in the tridimensional structure and consequently loss of fluorescence of the fluorescent sensor proteins of the present invention indicates the death of any living microorganism, including microbial spores.

In the biological indicator of the present invention, the denaturation of the sensor protein is therefore directly correlated with the death of the microbial spores. Consequently, the change in fluorescence resulting from the sensor protein denaturation guarantees the prediction of death of the spore population contained in the biological indicator.

The reliance of the biological indicator on these particular phenomena allows for immediate or instantaneous results. Therefore, if desired, determination of the efficacy of an oxidative sterilization process is available instantly, without having to invest in lengthy incubation times or costly procedures. In this case, time for enzyme catalytic activity is not necessary. The detectable change rate in a protein tridimensional structure subjected to an oxidizing agent concentration can be measured instantly, as opposed to measuring an enzymatic reaction.

As previously mentioned, the fluorescent sensor protein may be a chimeric protein comprising a non-fluorescent protein, the non-fluorescent protein being selected from lysozyme, amylase, lipase, pepsin, glucosidase, phosphatase, galactosidase, chymotrypsin and lipase, and a fluorescent protein selected from the group comprising green fluorescent proteins (GFPwt, EGFP, SFGFP, Emerald, avGFP, T-Saphire), blue fluorescent proteins (Sirius, Azurite, EBFP, EBFP2, mKalama1, TagGFP), cyan fluorescent proteins (ECFP, Cerulean, CyPet, mTurquoise2, SCFP), yellow fluorescent proteins (YFP, Citrine, Venus, YPet, SYFP, Topaz, mAmetrina), red fluorescent proteins (tdTomato, mPlum, DsRed, mCherry, mStrawberry, mRaspberry, mRuby) and orange fluorescent proteins (mOrange, mKO and mOrange2). The fluorescent protein may be associated, i.e. fused, bound or linked, to the non-fluorescent protein by methods well known to one skilled in the art, such as by being produced as a transcriptional fusion by a modified expression host such as Escherichia coli.

The top of the container comprises materials such as polypropylene fibers or high-density polyethylene fibers, permeable to the sterilizer agent and a polypropylene cap with lateral openings. The device has been described in detail with reference to the accompanying FIG. 3.

Preferably, all elements are sterilized prior to assembly with ethylene oxide 800 mg/mL for 2 hours. Said elements are then assembled in sterile conditions, with the spore containing carrier being inoculated with the spores prior to assembly in sterile conditions as well.

The method of use of the biological indicator will be described as follows and will be illustrated by means of non-limiting examples.

The method of the present invention comprises:
  a first step wherein the biological indicator is placed along with the target material to be sterilized within a sterilizer,
  a second step wherein an oxidative sterilization process is carried out at 50-60° C.,
  a third step wherein the biological indicator is placed in a previously conditioned incubator set at a temperature in the range of 55-65° C., preferably 58-62° C., yet more preferably 60° C., and the ampoule is broken by crushing it immediately before the biological indicator is placed within the incubator,
  a fourth step wherein the biological indicator is screened for optically detectable changes in fluorescence intensity, immediately after being placed in the previously conditioned incubator, while incubation of the biological indicator in the previously conditioned incubator is ongoing,
  a fifth step wherein the efficacy of the oxidative sterilization process is determined according to the fluorescence intensity screening results of the fourth step, a sixth step wherein the biological indicator is incubated for 24 hours-168 hours at a temperature in the range of 55-65° C., preferably 58-62° C., yet more preferably 60° C., a seventh step wherein the culture medium obtained in the sixth step is readout with a colorimetric component, screening for optically detectable changes in color 24-168 hours; and a last step wherein the efficacy of the oxidative sterilization process is determined according to the results of the colorimetric screening of the seventh step.

In a particular embodiment of the method of the present invention, the biological indicator is placed along with the material to be sterilized. The biological indicator is located inside a sterilizer besides the target material to be sterilized, in order to ensure that it undergoes the same sterilization conditions as the target, related to the position and temperature within the sterilizer.

In another particular embodiment, the biological indicator is placed in the areas that considered to be more inaccessible to the sterilizer agent. The oxidative sterilization process is subsequently carried out in the usual way. During this step, the cap of the biological indicator container is loose, i.e. the tube is not entirely sealed by the cap. In certain embodiments, the sterilization is carried out at 40-60° C. After the oxidative sterilization process is finished, the biological indicator is left to cool until it reaches room temperature. The incubator is previously conditioned for the readout and detection steps.

In a preferred embodiment, the incubator is capable of measuring fluorescence intensity by means of an integrated sensor. In a yet more preferred embodiment of the invention, the incubator is selected from the group consisting of a Terragene Incubator Reader BIONOVA® IC10/20FR, IC10/20FRLCD or a MiniBio incubator. The incubator is set to a temperature in the range of 55-65° C., preferably 58-62° C., yet more preferably 60° C. Once the desired temperature is reached, the cap is pressed to seal the tube, the ampoule is crushed, and the biological indicator is placed inside the previously prepared incubator. When the ampoule is crushed, the different components of the biological indicator are brought into contact. The ampoule should not be broken before the incubator reaches the desired temperature.

Immediately after being placed inside the incubator, the processed biological indicator yields an instantaneously detectable fluorescence signal. In general, the wavelengths used for excitation and emission will depend on the fluorescent sensor protein in the indicator.

In a particular embodiment of the invention, an effective sterilization is evidenced if fluorescence values change drastically (accordingly with the irreversible modification of the protein structure). If after 0 to 120 seconds of incubation an important change of fluorescence intensity is detected, it means that the sterilization was effective, sufficiently affecting the tridimensional structure of sensor proteins and changing the fluorescence emission.

The incubation at a temperature in the range of 55-65° C., 58-62° C., or 60° C. continues to allow the microbial spores growth in order to perform the colorimetric test for 24-168 hours. In a particular embodiment of the invention, if the sterilization was ineffective, the microbial spores are viable and therefore grow, whereby the culture medium changes color. This phenomenon is due to the varying medium pH or a metabolic enzyme activity with colorimetric components caused by the growth of microbial life, as is well known in the art.

The sterilization efficacy will be determined both by the optically observed change in fluorescence and by the optically observed change in the culture medium. In a particular embodiment, a positive control should be used to observe and compare the change in color and the presence of fluorescence.

EXAMPLES

Example 1

The example was carried out using a rapid sterilization system CASP® 50 Flash device, which allows to conduct sub lethal expositions in order to evaluate predictions of a biological indicator.

BIONOVA® BT96 biological indicators, which are the fastest indicators currently available in the market, were used for testing during the example along with the biological indicator of the present invention in order to obtain comparison data.

Fast readouts were obtained using an IC10/20FRLCD incubator. Extended readouts (7 days) were carried out in humidity chambers with 80% relative humidity at 60° C.

The culture medium contained in the ampoules of the biological indicator of the invention consisted of 1 g/L of bacteriological peptone; 1 g/L of yeast extract and 0.5 g/L of L-valine.

20 biological indicator of the invention and 20 control indicator tests were carried out for each particular exposure time.

Fluorescence readouts with the biological indicator of the invention were carried out within 0-20 seconds according to the method of the invention. Mean fluorescence values for 20 samples are shown in the table below. Ampoule contained bromocresol purple as colorimetric component of the culture medium.

Along with the ampoule, the carrier containing $2.5 \times 10^6$ CFU of *Geobacillus stearothermophilus* ATCC 7953 spores and 5 µg of EBFP as fluorescent sensor protein was laid inside the tube. Exposure cycles with increasing injection times were conducted with a 5% v/v hydrogen peroxide concentration according to the method of the invention.

| Injection Time (seconds) | Mean Fluorescence Instant readout | Standard Deviation | Positives 7 days readout | Positives 30 min readout BIONOVA BT96 | Positives 7 days readout BIONOVA BT96 |
|---|---|---|---|---|---|
| 200 | 6531.15 | 267 | 20/20 | 20/20 | 20/20 |
| 300 | 5869.70 | 211 | 16/20 | 20/20 | 14/20 |
| 400 | 4489.55 | 191 | 4/20 | 16/20 | 7/20 |
| 500 | 3271.10 | 120 | 0/20 | 4/20 | 0/20 |
| 600 | 2654.90 | 135 | 0/20 | 0/20 | 0/20 |

Example 2

Conditions of Example 1 were replicated, except for the variations indicated herein.

Ampoule contained bromocresol purple as colorimetric component of the culture medium.

Along with the ampoule, the carrier containing $2.5 \times 10^6$ CFU of *Geobacillus stearothermophilus* ATCC 7953 spores and 50 µg of mCherry as fluorescent sensor protein was laid inside the tube. Exposure cycles with increasing injection times were conducted with a 5% v/v hydrogen peroxide concentration according to the method of the invention.

| Injection Time (seconds) | Mean Fluorescence Instant readout | Standard Deviation | Positives 7 days readout | Positives 30 min readout BIONOVA BT96 | Positives 7 days readout BIONOVA BT96 |
|---|---|---|---|---|---|
| 200 | 4921.15 | 173 | 20/20 | 20/20 | 20/20 |
| 300 | 3756.30 | 158 | 13/20 | 19/20 | 14/20 |
| 400 | 3117.80 | 141 | 7/20 | 12/20 | 5/20 |
| 500 | 2518.35 | 121 | 0/20 | 2/20 | 0/20 |
| 600 | 2036.50 | 103 | 0/20 | 0/20 | 0/20 |

Example 3

Conditions of Example 1 were replicated, except for the variations indicated herein.

Ampoule contained 5-Bromo-4-chloro-3-indolyl β-D-galactopyranoside as colorimetric component of the culture medium.

Along with the ampoule, the carrier containing $2.5 \times 10^6$ CFU of *Geobacillus stearothermophilus* ATCC 7953 spores and 100 µg of YFP as fluorescent sensor protein was laid inside the tube. Exposure cycles with increasing injection times were conducted with a 5% v/v hydrogen peroxide concentration according to the method of the invention.

| Injection Time (seconds) | Mean Fluorescence Instant readout | Standard Deviation | Positives 7 days readout | Positives 30 min readout BIONOVA BT96 | Positives 7 days readout BIONOVA BT96 |
|---|---|---|---|---|---|
| 200 | 9723.40 | 340 | 20/20 | 20/20 | 20/20 |
| 300 | 7658.65 | 331 | 19/20 | 20/20 | 12/20 |
| 400 | 5248.25 | 229 | 5/20 | 15/20 | 3/20 |
| 500 | 4671.20 | 249 | 0/20 | 6/20 | 1/20 |
| 600 | 3964.30 | 198 | 0/20 | 0/20 | 0/20 |

Example 4

Conditions of Example 1 were replicated, except for the variations indicated herein.

Ampoule contained bromothymol blue was used as colorimetric component of the culture medium.

Along with the ampoule, the carrier containing $2.5 \times 10^6$ CFU of *Geobacillus stearothermophilus* ATCC 7953 spores and 75 µg of ECFP as fluorescent sensor protein was laid inside the tube. Exposure cycles with increasing injection times were conducted with a 5% v/v hydrogen peroxide concentration according to the method of the invention.

| Injection Time (seconds) | Mean Fluorescence Instant readout | Standard Deviation | Positives 7 days readout | Positives 30 min readout BIONOVA BT96 | Positives 7 days readout BIONOVA BT96 |
|---|---|---|---|---|---|
| 200 | 6924.20 | 198 | 20/20 | 20/20 | 20/20 |
| 300 | 6094.90 | 300 | 17/20 | 17/20 | 10/20 |
| 400 | 5149.85 | 218 | 4/20 | 5/20 | 1/20 |
| 500 | 4836.25 | 231 | 0/20 | 0/20 | 0/20 |
| 600 | 4298.75 | 225 | 0/20 | 0/20 | 0/20 |

Example 5

Conditions of Example 1 were replicated, except for the variations indicated herein.

Ampoule contained bromothymol blue was used as colorimetric component of the culture medium.

Along with the ampoule, the carrier containing $2.5 \times 10^6$ CFU of *Bacillus subtilis* ATCC 35021 spores and 25 µg of mOrange as fluorescent sensor protein was laid inside the tube. Exposure cycles with increasing injection times were conducted with a 5% v/v hydrogen peroxide concentration according to the method of the invention.

| Injection Time (seconds) | Mean Fluorescence Instant readout | Standard Deviation | Positives 7 days readout | Positives 30 min readout BIONOVA BT96 | Positives 7 days readout BIONOVA BT96 |
|---|---|---|---|---|---|
| 200 | 7737.05 | 332 | 20/20 | 20/20 | 20/20 |
| 300 | 7249.25 | 346 | 14/20 | 20/20 | 13/20 |
| 400 | 6683.80 | 213 | 5/20 | 8/20 | 1/20 |
| 500 | 5944.70 | 195 | 0/20 | 2/20 | 0/20 |
| 600 | 5462.50 | 246 | 0/20 | 0/20 | 0/20 |

The invention claimed is:

1. A biological indicator for determining the efficacy of an oxidative sterilization process, wherein said biological indicator comprises, in a single container,
    a set of microbial spores,
    at least one fluorescent sensor protein, and
    a culture medium,
    wherein the at least one fluorescent sensor protein is capable of yielding an optically detectable signal when the at least one fluorescent sensor protein is not in a denatured state due to the oxidative sterilization process, the at least one fluorescent protein being further capable of yielding a different optically detectable signal when the at least one sensor protein is in a denatured state after the oxidative sterilization process, said difference being independent of a catalytic activity of the at least one fluorescent sensor protein and the culture medium being brought into contact with the set of microbial spores,
    wherein said culture medium is capable of inducing growth of any viable microbial life present after the oxidative sterilization process,
    wherein said culture medium comprises a colorimetric component being capable of undergoing an optically detectable color shift in the presence of microbial growth,
    wherein denaturation of the fluorescent sensor protein is correlated with death of the microbial spores, a decrease in the optically detectable signal being indicative of a successful sterilization process, and
    wherein said fluorescent sensor protein is exogenous from said microbial spores and said decrease is detectable instantaneously after the sterilization process.

2. The biological indicator of claim 1, wherein the set of microbial spores are bacterial spores.

3. The biological indicator of claim 2, wherein the bacterial spores are spores originating from bacteria selected from the group comprising *Bacillus atrophaeus, Bacillus subtilis, Geobacillus stearothermophilus,* and *Bacillus pumilus.*

4. The biological indicator of claim 1, wherein the set of microbial spores is embedded in a carrier made of a porous material.

5. The biological indicator of claim 1, wherein the set of microbial spores is embedded in the container.

6. The biological indicator of claim 1, wherein the set of microbial spores is embedded in a carrier made of a material selected from polypropylene fiber materials and high-density polyethylene fibers.

7. The biological indicator of claim 1, wherein the at least one fluorescent sensor protein is selected from a green fluorescent protein, a blue fluorescent protein, a cyan fluorescent protein, a yellow fluorescent protein, a red fluorescent protein, an orange fluorescent protein, and combinations or chimeric proteins thereof.

8. The biological indicator of claim 1, wherein the culture medium comprises 0.03 g/L of the colorimetric component.

9. The biological indicator of claim 1, wherein the colorimetric component of the culture medium is selected from bromocresol purple, bromocresol green, phenol red, thymol blue, bromophenol blue, bromothymol blue, 6-chloro-3-indoxyl-alpha-D-glucopyranoside, 5-bromo-4-chloro-3-indolyl α-D-glucopyranoside, 6-chloro-3-indoxyl-beta-D-galactopyranoside, 5-bromo-4-chloro-3-indolyl β-D-galactopyranoside, 5-bromo-4-chloro-3-indoxyl phosphate and mixtures thereof.

10. The biological indicator of claim 1, wherein the culture medium is contained in a container separate from the microbial spores.

11. The biological indicator of claim 1, wherein the culture medium pH is between 6 to 9.

12. The biological indicator of claim 1, wherein the at least one fluorescent sensor protein and the microbial spores are mixed together as a formulation in a carrier.

13. The biological indicator of claim 1, wherein the at least one fluorescent sensor protein is contained in a separate ampoule capable of being crushed inside in order to release its contents within the biological indicator.

14. The biological indicator of claim 1, wherein the at least one fluorescent sensor protein is embedded in a carrier within the biological indicator.

15. The biological indicator of claim 1, wherein the protein has no catalytic function or activity with respect to the set of microbial spores.

16. The biological indicator of claim 1, wherein the oxidative sterilization process is a process employing an oxidizing agent selected from ozone, oxygen, hydrogen peroxide and sulfuric acid.

17. The biological indicator of claim 1, wherein the at least one fluorescent protein is capable of yielding a lower optically detectable signal when the at least one sensor protein is in a denatured state after the oxidative sterilization process.

18. A biological indicator for determining the efficacy of an oxidative sterilization process, said biological indicator comprising, in a single container:
   a set of microbial spores;
   at least one fluorescent sensor protein; and
   a culture medium,
   wherein the at least one fluorescent sensor protein is capable of yielding an optically detectable signal when the at least one fluorescent sensor protein is not in a denatured state due to the oxidative sterilization process, the at least one fluorescent protein being further capable of yielding a different optically detectable signal when the at least one sensor protein is in a denatured state after the oxidative sterilization process, said difference being independent of a catalytic activity of the at least one fluorescent sensor protein and the culture medium being brought into contact with the set of microbial spores,
   wherein said culture medium is capable of inducing growth of any viable microbial life present after the oxidative sterilization process,
   wherein said culture medium comprises a colorimetric component being capable of undergoing an optically detectable color shift in the presence of microbial growth, and
   wherein the fluorescent sensor protein is a chimeric protein comprising a non-fluorescent protein selected from lysozyme, amylase, lipase, pepsin, glucosidase, phosphatase, galactosidase, chymotrypsin and lipase and a fluorescent protein selected from the group comprising green fluorescent proteins (Green Fluorescent Protein wild type GFPwt, Enhanced Green Fluorescent Protein EGFP, Super Folder Green Fluorescent Protein SFGFP, Emerald, *Aequorea Victoria* jellyfish Green Fluorescent Protein avGFP, T-Saphire), blue fluorescent proteins (Sirius, Azurite, Enhanced Blue Fluorescent Protein EBFP, Enhanced Blue Fluorescent Protein 2 EBFP2, mKalama1, Enhanced Tagged Green Fluorescent Protein TagGFP), cyan fluorescent proteins (Enhanced Cyan Fluorescent Protein ECFP, Cerulean, CyPet, mTurquoise2, Super Cyan Fluorescent Protein SCFP), yellow fluorescent proteins (Yellow Fluorescent Protein YFP, Citrine, Venus, YPet, Super Yellow Fluorescent Protein SYFP, Topaz, mAmetrina), red fluorescent proteins (tdTomato, mPlum, DsRed, mCherry, mStrawberry, mRaspberry, mRuby) and orange fluorescent proteins (mOrange, monomeric Kusabira Orange mKO and mOrange2).

19. A method of determining the efficacy of an oxidative sterilization process, by means of a self-contained biological indicator, wherein said biological indicator comprises, in a single container,
   wherein the at least one fluorescent sensor protein is capable of yielding an optically detectable signal when the at least one fluorescent sensor protein is not in a denatured state due to the oxidative sterilization process, the at least one fluorescent protein being further capable of yielding a different optically detectable signal when the at least one sensor protein is in a denatured state after the oxidative sterilization process, said difference being independent of a catalytic activity of the at least one fluorescent sensor protein and the culture medium being brought into contact with the set of microbial spores,
   wherein said culture medium is capable of inducing growth of any viable microbial life present after the oxidative sterilization process,
   wherein said culture medium comprises a colorimetric component being capable of undergoing an optically detectable color shift in the presence of microbial growth,
   wherein denaturation of the fluorescent sensor protein is correlated with death of the microbial spores, a decrease in the optically detectable signal being indicative of a successful sterilization process,
   wherein said fluorescent sensor protein is exogenous from said microbial spores and said decrease is detectable instantaneously after the sterilization process, and
   wherein the method comprises the steps of:
   a) placing the biological indicator along with a target material to be sterilized within a sterilizer,
   b) carrying out an oxidative sterilization process,
   c) placing the biological indicator in an incubator,
   d) screening the biological indicator for immediate detectable changes in fluorescence intensity, while incubating the biological indicator in the incubator,
   e) determining the efficacy of the oxidative sterilization process based on the screening carried out during step d),
   f) extending the incubation of the biological indicator obtained in step d)
   g) screening the incubated biological indicators obtained in step e) for an optically detectable color change, and
   h) determining the efficacy of the oxidative sterilization process, according to optically detectable changes obtained in step g).

* * * * *